F. M. ERWIN.
HAY STACKER.
APPLICATION FILED FEB. 8, 1909.
941,238.
Patented Nov. 23, 1909.
2 SHEETS—SHEET 1.
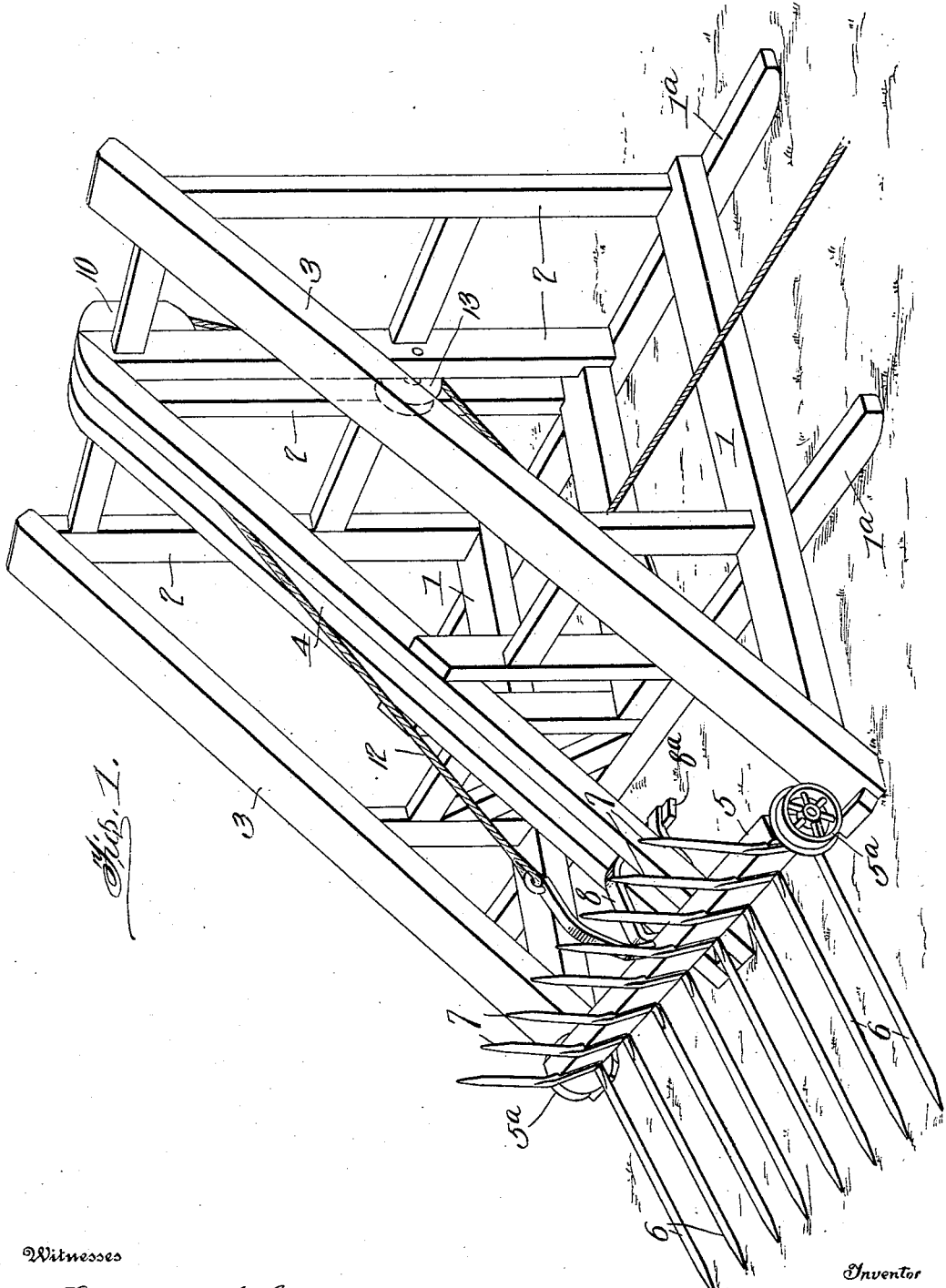
Witnesses
Oliver H. Holmes
E. B. McBath
Inventor
F. M. Erwin
By O'Meara & Brock
Attorneys F. M. ERWIN.
HAY STACKER.
APPLICATION FILED FEB. 8, 1909.
941,238.
Patented Nov. 23, 1909.
2 SHEETS—SHEET 2.
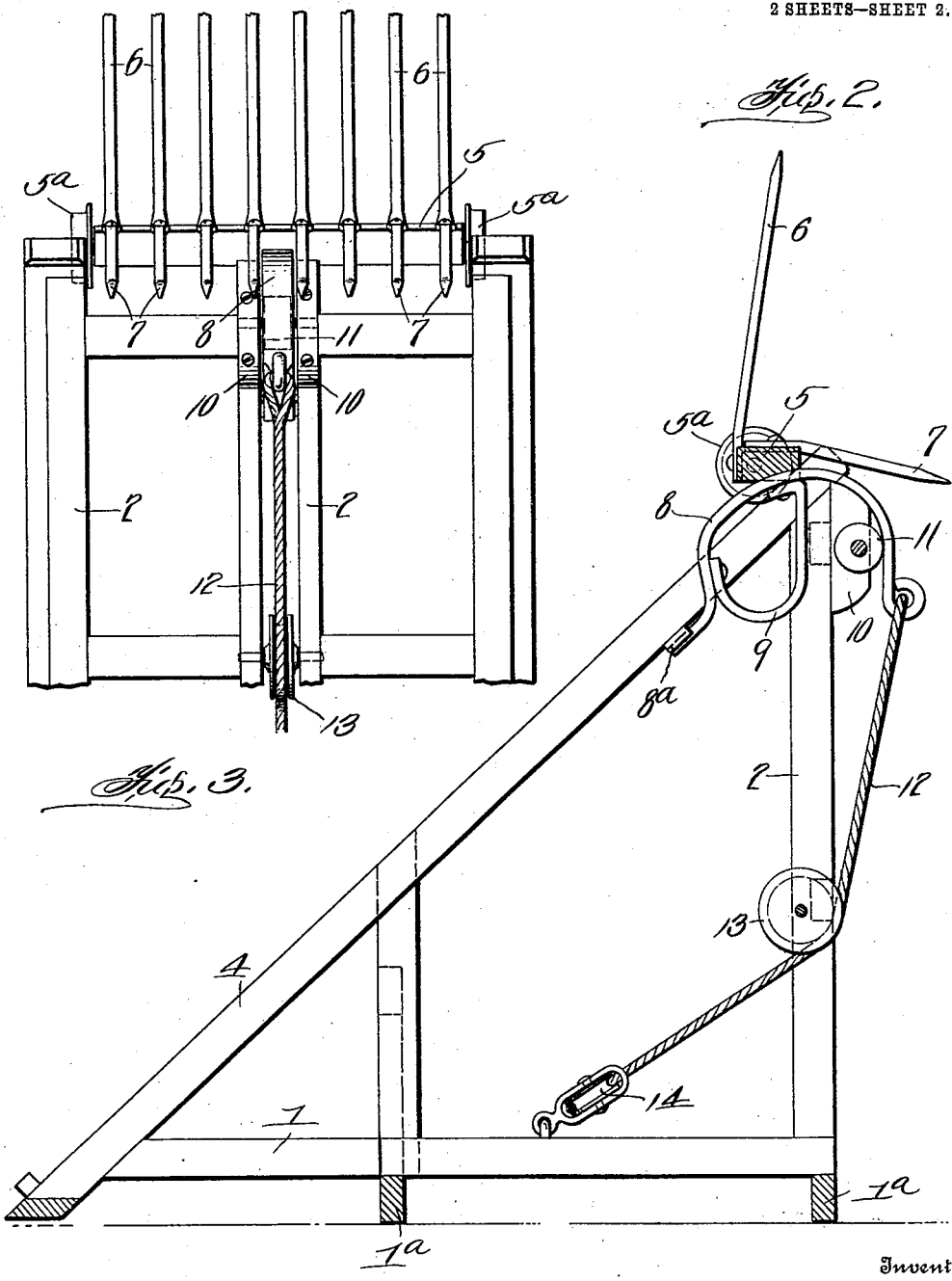

UNITED STATES PATENT OFFICE.

FRANCIS M. ERWIN, OF KINSLEY, KANSAS.

HAY-STACKER.

941,238.　　　　　Specification of Letters Patent.　　Patented Nov. 23, 1909.

Application filed February 8, 1909.　Serial No. 476,584.

*To all whom it may concern:*

Be it known that I, FRANCIS M. ERWIN, a citizen of the United States, residing at Kinsley, in the county of Edwards and State of Kansas, have invented a new and useful Improvement in Hay-Stackers, of which the following is a specification.

This invention relates to a device for stacking or loading hay, and it can be employed either for delivering the hay to a fixed platform or to a wagon.

The object of the invention is to expedite the handling of hay in large quantities, and also to provide a hay handling device which can be cheaply constructed and which can be handled by one man.

The invention consists in the novel features of construction hereinafter fully described, pointed out in the claims, and shown in the accompanying drawings, in which:

Figure 1 is a perspective view of the complete device, in position to receive a load of hay. Fig. 2 is a vertical section, the hay handling mechanism being shown in position to deliver the hay. Fig. 3 is a partial rear end view, the parts being shown in the position occupied in Fig. 2.

In these drawings 1 represents a suitable base mounted for convenience of transportation upon skids or runners 1$^a$ and carrying a number of upright posts 2 suitably braced together to form an upright frame which supports an inclined frame 3, also suitably braced. The inclined frame 3 consists essentially of upwardly and rearwardly extending beams preferably four in number, including two outer or side beams and two centrally arranged beams, the side beams forming a trackway upon which the hay handling mechanism travels, and the centrally arranged beams being spaced slightly apart in order to form between them a guideway 4, the object of which will appear hereafter.

The hay handling mechanism consists of a transversely arranged beam 5 mounted upon flanged wheels 5$^a$ which travel upon the side beams of the inclined frame 3. A series of teeth 6 and 7 are carried by the beam, the said teeth being set at right angles to the beam, and the teeth 6 which receive and support the hay are of greater length than the teeth 7, which teeth are set at an angle of 45 or more degrees with respect to the teeth 6, and which serve to prevent the hay from prematurely falling over the beam end of the teeth 6. To the under side of the beam is secured the bow portion of a U-shaped bracket 8, which bracket acts as a guide for the carriage formed by the beam 5 and the sets of teeth 6 and 7, and this bracket has secured within its bow portion a bracing strip 9, which prevents the guide strip 8 from being bent out of shape by continued use. The forward end of the strip 8 is provided with a transversely arranged stop plate 8$^a$ which strikes the under sides of the central beam as the rear end of the strip runs down over a pulley 11 mounted between two blocks 10 carried by the central uprights 2, the ends of the blocks 10 being rounded. For convenience of handling, I provide also pulleys 13 and 14 over which runs a draft rope 12 secured to the rear free end of the U-shaped guide strip 8.

In operation the hay is thrown upon the teeth 6 with the parts in the position shown in Fig. 1, and by drawing upon the rope 12, the carriage is hoisted upon the incline and as the guide strip 8 works over the roller 11, the beam 5 will be given a half rotation, thus elevating the teeth 6 and throwing the hay from the carriage upon the wagon or platform. When the rope is pulled from the side, it runs over the pulleys 13 and 14, but if desired a straight pull can be given upon the rope, and it is not absolutely necessary to run it over the swiveled pulley.

What I claim is:

1. A device of the kind described comprising a longitudinally slotted inclined frame, a hay receiving carriage movable along said frame, a U-shaped guide strip carried by the carriage and traveling in said slot, a cable attached to said strip, and a roller in alinement with the upper end of the slot, the cable and guide strip working upon said roller, as and for the purpose set forth.

2. A device of the kind described comprising a base, uprights at one end of the base, inclined beams supported by the base and the uprights, said beams forming respectively a trackway and a guideway, a wheeled carriage traveling upon the trackway a U-shaped guide bracket, the bow portion of which is secured to the under side of the carriage, the strip traveling on the guideway, a cable attached to the rear end of the strip, and a roller arranged at the upper end of the guideway, the cable and guide strip working upon said roller.

3. A device of the kind described comprising an inclined frame forming a trackway, portions of said frame being spaced apart to form a guideway, a beam arranged transversely to the inclined frame, oppositely arranged sets of teeth carried by said beam, a U-shaped guide strip secured to the under side of the beam and traveling in the guideway, a cable connected to said strip, and a roller arranged at the upper end of the guideway, the cable and strip working upon said roller.

FRANCIS M. ERWIN.

Witnesses:
 MARTIN SHAY,
 GEO. B. MCLAUGHLIN.